United States Patent [19]

Kanazawa

[11] Patent Number: 4,725,974

[45] Date of Patent: Feb. 16, 1988

[54] ELECTRONIC CIRCUIT CAPABLE OF ACCURATELY CARRYING OUT A SUCCESSION OF DIVISIONS IN A PIPELINE FASHION

[75] Inventor: Takashi Kanazawa, Tokyo, Japan

[73] Assignee: NEC Corporation, Tokyo, Japan

[21] Appl. No.: 699,307

[22] Filed: Feb. 7, 1985

[30] Foreign Application Priority Data

Feb. 7, 1984 [JP] Japan .................................. 59-19502

[51] Int. Cl.$^4$ .............................................. G06F 7/52
[52] U.S. Cl. .................................................... 364/765
[58] Field of Search ................. 364/765, 763, 762, 761

[56] References Cited

U.S. PATENT DOCUMENTS

| 3,828,175 | 8/1974 | Amdahl et al. ...................... 364/765 |
| 4,488,247 | 12/1984 | Inagami et al. ...................... 364/765 |
| 4,603,397 | 7/1986 | Ohtsuki et al. ...................... 364/763 |

OTHER PUBLICATIONS

Singh, "High Speed Array-Assisted Binary-Decimal Divider", *IBM Tech. Disclosure Bulletin*, vol. 20, No. 3, Aug. 1977, pp. 1038-1040.

*Primary Examiner*—David H. Malzahn
*Attorney, Agent, or Firm*—Schwartz, Jeffery, Schwaab, Mack, Blumenthal & Evans

[57] ABSTRACT

In an electronic circuit for dividing a dividend (RR) by a divisor (RD) to calculate an eventual quotient (Q) divisible into first through N-th partial quotients, each being represented by a g-ary number, an approximate reciprocal (RC) of the divisor is read out of a memory (34) and multiplied in a first multiplication circuit (36) by the divisor to obtain a correction factor ($C_1$). A second multiplication circuit (37) multiplies the dividend by the approximate reciprocal to calculate a first provisional quotient which is near to the eventual quotient and which is processed into a first partial provisional quotient ($P_1$) and a second provisional quotient by a first adder circuit (61) and a second partial divider ($64_1$), respectively. The first partial provisional quotient is modified into the first partial quotient $Q_1$ with reference to the second provisional quotient in a first correction circuit ($66_1$). Likewise, an i-th partial quotient ($Q_i$) except the first partial quotient is successively produced from an i-th correction circuit ($66_i$) by modifying an i-th partial provisional quotient ($P_i$) with reference to an (i+1)-th provisional quotient. Thus, the first through the N-th partial quotients successively appear from the first through the N-th correction circuits and are synchronously produced as the eventual quotient from a synchronization circuit (105).

3 Claims, 6 Drawing Figures

ELECTRONIC CIRCUIT CAPABLE OF CARRYING ACCURATELY OUT A SUCCESSION OF DIVISIONS IN A PIPELINE FASHION

BACKGROUND OF THE INVENTION

This invention relates to an electronic circuit for use in dividing a dividend by a divisor to calculate a quotient and, in particular, to an electronic circuit capable of calculating the quotient by the use of an approximate reciprocal of the divisor.

As will later be described with reference to one of several figures of the accompanying drawing, an electronic circuit of the type described is proposed by H. Matsumoto in Japanese unexamined patent publication No. Syô 57-41,737, namely, 41,737/1982. With the electronic circuit, it is possible to calculate an eventual quotient which has a plurality of digits, N in number, for g-ary numbers and which is divisible into first through N-th partial quotients for the respective digits.

More particularly, the proposed electronic circuit carries out current division between a dividend and a divisor with reference to an approximate reciprocal of the divisor and a correction factor which is given by a product between the approximate reciprocal and the divisor and is therefore nearly equal to unity. The correction factor is therefore calculated by a multiplying circuit. Subsequently, the dividend is multiplied by the approximate reciprocal by the multiplying circuit to produce a primitive quotient which is equal to a product between the dividend and the approximate reciprocal. Thereafter, the primitive quotient is processed by the multiplying circuit into the first through the N-th partial quotients in accordance with a predetermined algorithm.

Anyway, the multiplying circuit may be an adder and should repeatedly be used to calculate the correction factor, the primitive quotients, and so on. Consequently, the next following division can not be started until the current division is finished. Thus, the electronic circuit can not achieve a high throughput on processing the division.

In Cray-1S SERIES HARDWARE REFERENCE MANUAL HR-0808 published 1980, 1981, by Cray Research Inc., Newton's method is used to accurately calculate a reciprocal of a divisor. The calculation of the reciprocal is carried out in a so-called pipeline method at a high speed. Although the reciprocal is accurately calculated, an objectionable error takes place such that a final residue becomes negative.

SUMMARY OF THE INVENTION

It is an object of this invention to provide an electronic circuit which can accomplish a high throughput on carrying out division.

It is another object of this invention to provide an electronic circuit of the type described, which can successively carry out the division in a pipeline method.

It is a further object of this invention to provide an electronic circuit of the type described, wherein no objectionable error takes place.

An electronic circuit to which this invention is applicable is for use in dividing a dividend by a divisor to calculate an eventual quotient which has a plurality of digits, N in number, and is divisible into first through N-th partial quotients for the respective digits. The electronic circuit includes reciprocal calculating means responsive to the divisor for calculating an approximate reciprocal of the divisor. According to this invention, the electronic circuit comprises first calculating means responsive to the divisor and the approximate reciprocal for calculating a correction factor which is equal to a product of the divisor and the approximate reciprocal, second calculating means responsive to the dividend and the approximate reciprocal for calculating a first provisional quotient which is equal to a product of the dividend and the approximate reciprocal, processing means responsive to the correction factor and the first provisional quotient for processing the first provisional quotient with reference to the correction factor to produce a succession of the first through the N-th partial quotients, and collecting means for collecting the succession of first through N-th partial quotients into the eventual quotient.

DESCRIPTION OF THE PREFERRED EMBODIMENT

Figure 1:
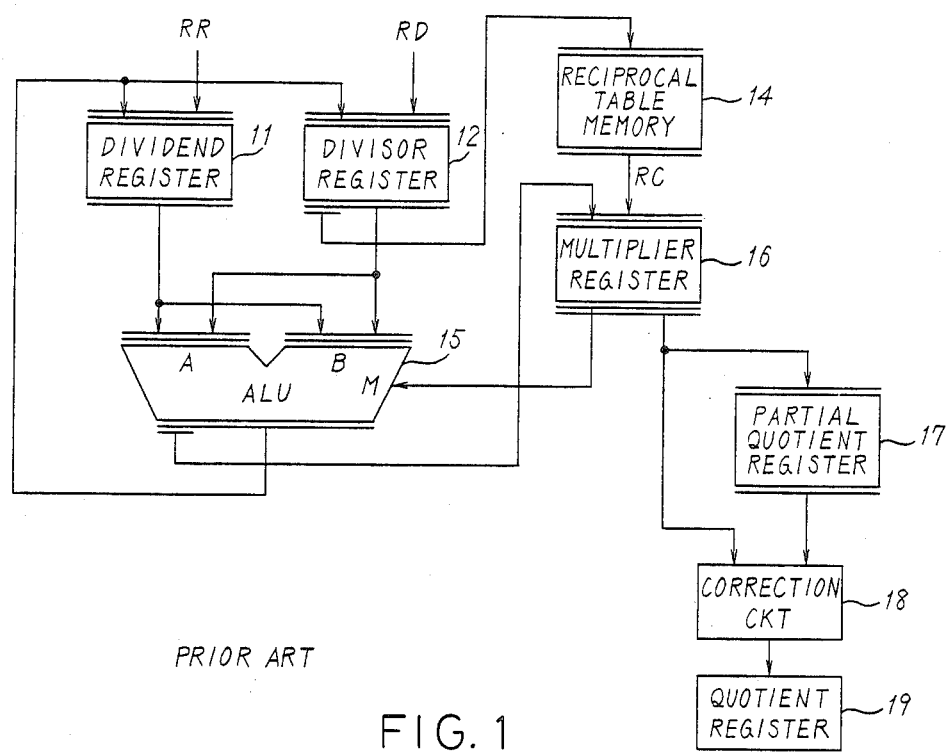
FIG. 1 is a block diagram of a conventional electronic circuit for use in carrying out division.

Referring to FIG. 1, a conventional electronic circuit will be described for a better understanding of this invention. The illustrated electronic circuit is substantially equivalent to that mentioned in the background section of the instant specification and is supplied with a dividend RR and a divisor RD to produce an eventual or final quotient Q which has a plurality of digits, N in number, and which is divisible into first through N-th partial quotients $Q_1, Q_2, \ldots$, and $Q_N$ for the respective digits. Let each digit be represented by a g-ary number having a base of g. In this connection, each of the dividend RR and the divisor RD is also of the g-ary number. In the example being illustrated, it is assumed that each of the dividend RR, the divisor RD, and the partial quotients $Q_i$ is represented by a hexadecimal number and given in the form of a binary electric signal. As a result, the base g is equal to sixteen and each digit can be represented by four bits.

The dividend RR and the divisor RD are at first kept in a dividend register 11 and a divisor register 12 in a known manner, respectively. The divisor RD is partially sent to a reciprocal table memory 14 which memorizes a reciprocal table for conversion of various divisors into the corresponding approximate reciprocals. Accessed by a part of the divisor RD, the reciprocal table memory 14 produces a selected one of the approximate reciprocals. The selected approximate reciprocal is supplied to an arithmetic logic unit (ALU) 15 through a multiplier register 16.

In the illustrated electronic circuit, the divisor RD is multiplied by the selected approximate reciprocal to calculate a correction factor C which is near to unity.

Subsequently, the dividend RR is multiplied by the selected approximate reciprocal to calculate a first provisional quotient $R_1$ which has a plurality of digits and which may approximate the eventual quotient Q. A rounding operation is carried out as regards the first provisional quotient $R_1$ to derive a first partial provisional quotient $P_1$ from the first provisional quotient $R_1$. A second provisional quotient $R_2$ is calculated with reference to the correction factor C, the first provisional quotient $R_1$, and the first partial provisional quotient $P_1$. The first partial provisional quotient $P_1$ is modified into the first partial quotient $Q_1$ with reference to the first partial provisional quotient $P_1$ and the second provisional quotient $R_2$ in a manner disclosed by H. Matsumoto.

A similar operation is repeated to calculate the remaining provisional quotients and the remaining partial provisional quotients and to modify the partial provisional quotients into the respective partial quotients. In general, an i-th provisional quotient $R_i$ is calculated from an (i−1)-th provisional quotient $R_{i-1}$, an (i−1)-th partial provisional quotient $P_{i-1}$, and the correction factor C in accordance with a recurrence formula given by:

$$R_i=(R_{i-1}-P_{i-1}C)\cdot g. \qquad (1)$$

It has been proved by H. Matsumoto that the eventual quotient Q calculated in the above-mentioned manner gives a true quotient and that no negative residue appears because the i-th partial provisional quotient $P_i$ is modified with reference to the (i+1)-th provisional quotient $R_{i+1}$.

In FIG. 1, the above-mentioned calculation is carried out by the use of the arithmetic logic unit 15. Specifically, the arithmetic logic unit 15 is successively and repeatedly operated to calculate the correction factor C, the provisional quotients R (suffix omitted), the partial provisional quotients P and the like. For this purpose, the arithmetic logic unit 15 is supplied with first, second, and third input signals depicted at A, B, and M and can selectively carry out calculations as will become clear as the description proceeds.

At first, the selected approximate reciprocal and the divisor RD are supplied from the multiplier register 16 and the divisor register 12 to the arithmetic logic unit 15. The arithmetic logic unit 15 calculates a product of the selected approximate reciprocal and the divisor RD with the selected approximate reciprocal left in the multiplier register 16. The product is representative of the correction factor C and is kept in the divisor register 12. Preferably, the correction factor C takes on a negative value in consideration of the procedure described below.

The dividend RR and the selected approximate reciprocal are supplied to the arithmetic logic unit 15 as the second and the third input signals B and M from the dividend register 11 and the multiplier register 16, respectively. Multiplication is carried out between the dividend RR and the selected approximate reciprocal in the arithmetic logic unit 15 to calculate the first provisional quotient $R_1$. The first provisional quotient $R_1$ is delivered to the dividend register 11 to be stored therein.

Subsequently, the first provisional quotient $R_1$ is sent to the arithmetic logic unit 15 to be subjected to the rounding operation. The rounding operation is carried out at a predetermined digit with reference to the number of g. In any event, the first partial provisional quotient $P_1$ is calculated by the arithmetic logic unit 15 to be delivered to the multiplier register 16.

Subsequently, the first partial provisional quotient $P_1$ is sent to a partial quotient register 17 with the first partial quotient $P_1$ left in the multiplier register 16. Under the circumstances, the arithmetic logic unit 15 calculates the second provisional quotient $R_2$ in accordance with the recurrence formula (1) in response to the first provisional quotient $R_1$, the first partial provisional quotient $P_1$, and the correction factor C. The second provisional quotient $R_2$ is delivered from the arithmetic logic unit 15 to the dividend register 11.

The second provisional quotient $R_2$ is further delivered to the arithmetic logic unit 15 with the second provisional quotient $R_2$ kept in the dividend register 11. The rounding operation is again carried out to derive the second partial provisional quotient $P_2$ from the second provisional quotient $R_2$. The second partial provisional quotient $P_2$ is sent to the multiplier register 16.

Supplied with the first and the second partial provisional quotients $P_1$ and $P_2$ from the partial quotient register 17 and the multiplier register 16, respectively, a correction circuit 18 modifies the first partial provisional quotient $P_1$ into the first partial quotient $Q_1$ in consideration of the second partial provisional quotient $P_2$. The first partial quotient $Q_1$ is kept in a quotient register 19.

Thereafter, the following partial quotients are successively stored in the quotient register 19 to provide the eventual quotient Q. Thus, the arithmetic logic unit 15 should be successively and iteratively put into operation during carrying out the division. Therefore, the division is time consuming with the illustrated electronic circuit.

Figure 2:
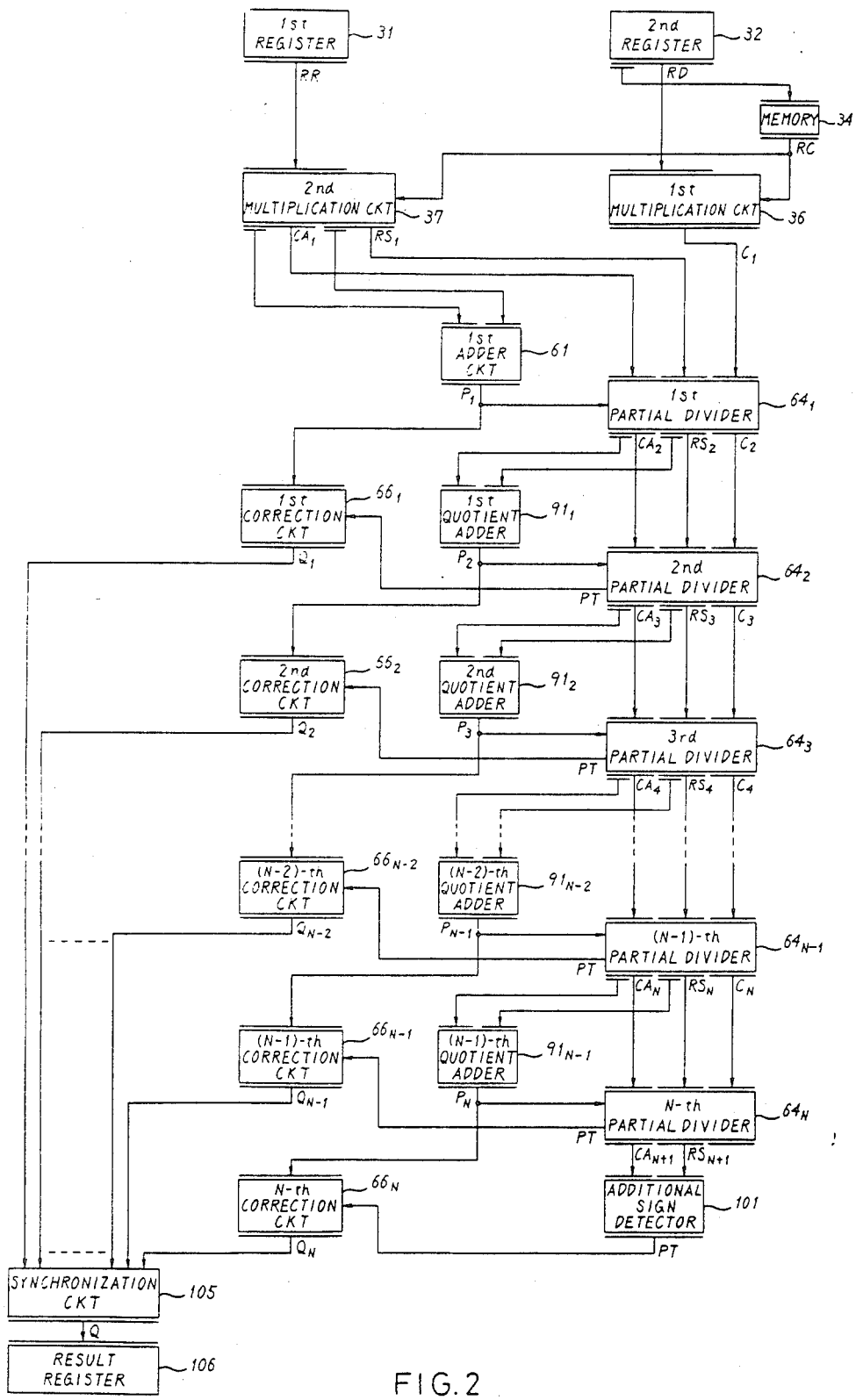
FIG. 2 is a block diagram of an electronic circuit according to a preferred embodiment of this invention.

Referring to FIG. 2, an electronic circuit according to a preferred embodiment of this invention is similar in operation to that illustrated in FIG. 1 except that a succession of divisions can continuously be carried out in the electronic circuit of FIG. 2. This means that, when a current one of the divisions is succeeded by the following division, the following division can be started before completion of the current division.

More particularly, the electronic circuit illustrated in FIG. 2 comprises first and second registers 31 and 32 which are loaded with the dividend RR and the divisor RD in the known manner, respectively. Like in FIG. 1, each of the dividend RR and the divisor RD is assumed to be a hexadecimal number and to be represented by a binary number of four bits. It is also assumed that the dividend RR is normalized within a range smaller than $2^3$ while the divisor RD is normalized within another range smaller than unity and not smaller than $2^{-1}$. In the example being illustrated, let the first and the second registers 31 and 32 be loaded with $(02)_{16}$ and $(0.AE)_{16}$ as the dividend RR and the divisor RD, respectively.

The divisor RD is partially sent to a memory which is similar to the reciprocal table memory 14 illustrated in FIG. 1 and which is indicated at 34. Accessed by the divisor RD, the memory 34 produces an approximate reciprocal RC corresponding to the divisor RD. For example, the approximate reciprocal RC may be equal to $(1.78)_{16}$ corresponding to $(0.AE)_{16}$. The approximate reciprocal RC is delivered from the memory 34 to first and second multiplication circuit 36 and 37.

Figures 3, 4:
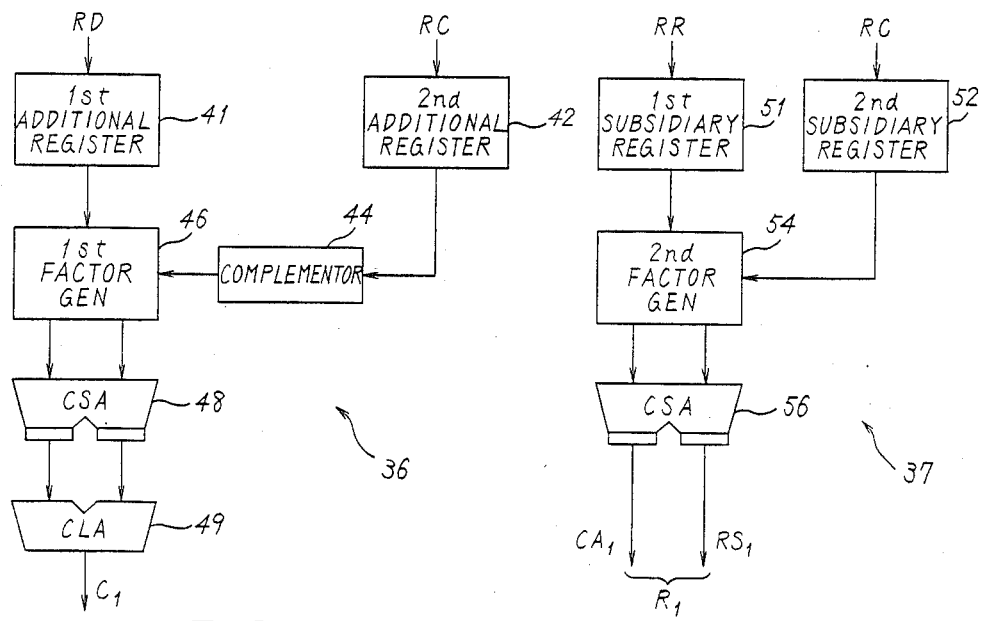
FIG. 3 is a block diagram of a first multiplication circuit for use in the electronic circuit illustrated in FIG. 2.
FIG. 4 is a block diagram of a second multiplication circuit for use in the electronic circuit illustrated in FIG. 2.

Referring to FIG. 3 together with FIG. 2, the first multiplication circuit 36 multiplies the divisor RD by the approximate reciprocal RC to calculate a correction factor (depicted at $C_1$) which is equal to a product of the approximate reciprocal RC and the divisor RD. In the example being illustrated, the correction factor $C_1$ is equal to $(-0.AE)_{16} \times (1.78)_{16}$, namely, $(-0.FF)_{16}$. Thus, the approximate reciprocal RC is given to the first calculation circuit 36 in the form of a negative number so as to facilitate the following procedure. Production of the negative number is possible in the known manner and will not be described any longer. Let the illustrated multiplication circuit 36 be operable in accordance with Booth algorithm known in the art.

Specifically, first and second additional registers 41 and 42 are loaded with the divisor RD and the approximate reciprocal RC, respectively. The approximate reciprocal RC is assumed to be represented by eight parallel bits of $m_0, m_1, \ldots,$ and $m_7$ and to take the form of $(m_0 m_1 . m_2 m_3 m_4 m_5 m_6 m_7)_2$. The approximate reciprocal RC is sent to a complement calculator, namely, complementor 44 to calculate that complement of the approximate reciprocal RC which may be two's complement. In order to stand for the two's complement of the approximate reciprocal RC, the complementor 44 at first calculates one's complement of the approximate reciprocal RC given by $(\overline{m_0 m_1}.\overline{m_2 m_3 m_4 m_5 m_6 m_7})_2$ and adds an extra bit $\overline{m_8}$ to the one's complement with a logic "1" level kept at the extra bit $\overline{m_8}$. Thus, the two's complement is represented by nine parallel bits $m_0$ through $m_8$.

On carrying out multiplication, the two's complement of the approximate reciprocal RC serves as a multiplier while the divisor RD serves as a multiplicand. As known in the art, the Booth algorithm is useful for reducing the number of partial products inevitably occurring on carrying out multiplication. According to the Booth algorithm, the multiplier is divided into a plurality of bit groups each of which consists of three bits and which can take eight kinds of patterns. Predetermined multiplying factors are assigned to the respective patterns in accordance with Table 1.

TABLE 1

| Patterns | Multiplying factors |
|---|---|
| 0 0 0 | 0 |
| 0 0 1 | 1 |
| 0 1 0 | 1 |
| 0 1 1 | 2 |
| 1 0 0 | −2 |
| 1 0 1 | −1 |
| 1 1 0 | −1 |
| 1 1 1 | 0 |

A first factor generator 46 assigns a selected one of the multiplying factors listed on Table 1 to each bit group of the two's complement in consideration of each pattern of the bit groups. In the first factor generator 46, the selected multiplying factors are multiplied by weights determined with reference to positions of the bit groups. In the example being illustrated, the weights of $1, 2^{-2}, 2^{-4},$ and $2^{-6}$ are assigned to the respective groups in the following manner.

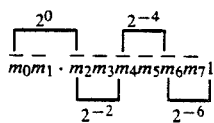

At any rate, the selected multiplying factors multiplied by the weights serve as partial multipliers by which the divisor RD given as the multiplicand is multiplied in the first factor generator 46. A set of partial products are sent from the first factor generator 46 to a carry saving adder (CSA) 48 of a multiple input type. The carry saving adder 48 calculates a sum of the partial products independently of a carry resulting from the calculation in the known manner to produce an end sum and an end carry. The end sum and the end carry are summed up in a carry lookahead adder (CLA) 49 to be produced as the correction factor $C_1$ equal to $(-0.FF9)_{16}$.

Referring to FIG. 4 afresh and FIG. 2 again, the second multiplication circuit 37 is operable simultaneously with the first multiplication circuit 36 in response to the dividend RR and the approximate reciprocal RC. In FIG. 4, the dividend RR and the approximate reciprocal RC are stored in first and second subsidiary registers 51 and 52, respectively, and sent to a second factor generator 54. The second factor generator 54 is operable in a manner similar to the first factor generator 46 to produce additional partial products in consideration of the multiplying factors listed on Table 1 and the weights as mentioned before. The additional partial products are supplied to an additional carry saving adder 56 of a multiple input type to be summed up. As a result, the additional carry saving adder 56 produces a first sum $RS_1$ of the partial products and a first carry $CA_1$ both of which appear as a first provisional quotient $R_1$ equal to a product of the dividend RR and the approximate reciprocal RC.

The illustrated second multiplication circuit 37 carries out multiplication of $(02)_{16}$ and $(1.78)_{16}$ given as the dividend RR and the approximate reciprocal RC, respectively, to produce the first provisional quotient $R_1$ equal to $(2.F0)_{16}$. Specifically, the approximate reciprocal RC of $(1.78)_{16}$ is represented by eight bits of $(10.111100)_2$ in the binary notation and is stored in the second subsidiary register 52. An extra bit is added under the least significant bit in consideration of a rounding operation to be carried out later and is kept at the logic "0." In this case, first through fourth ones (101), (111), (110), and (000) of the bit groups are successively formed from the most significant bit of the approximate reciprocal RC to the extra bit thereof and given the multiplying factors of $-1, 0, -1,$ and 0, respectively, in accordance with Table 1. The multiplying factors of $-1, 0, -1,$ and 0 are multiplied by $2^0, 2^{-2}, 2^{-4},$ and $2^{-6}$ to produce first through fourth partial reciprocals, respectively.

On the other hand, the dividend RR of $(02)_{16}$ is represented by $(000010.0)_2$ in the binary notation and is multiplied in the second factor generator 54 by the first through the fourth partial reciprocals to calculate first through fourth ones of the additional partial products, respectively. The first through the fourth additional partial products are summed up in the additional carry saving adder 56 in the above-mentioned manner. Anyway, the first sum $RS_1$ and the first carry $CA_1$ appear in the form of $(111000.11101110)_2$ and $(001010.00000010)_2$, respectively.

The multiplying factors and the weights may be assigned to the dividend RR of $(000010.0)_2$. In this event, the multiplying factors of 0, 1, and $-2$ and the weights of $2^4, 2^2,$ and $2^0$ are assigned to three of the bit groups of the dividend RR.

Turning back to FIG. 2, the first sum $RS_1$ and the first carry $CA_1$ are partially sent to a first adder circuit 61 for calculating a first partial provisional quotient $P_1$ which may be modified as will become clear as the description proceeds. In the example being illustrated, nine upper bits of the first sum $RS_1$ and the first carry $CA_1$ are supplied to the first adder circuit 61 to be added to each other. A result of addition becomes equal to $(000010.1)_2$ when taken to the first place under the binary point and is produced as the first partial provisional quotient $P_1$.

The first partial provisional quotient $P_1$ is delivered to a first partial divider $64_1$ and a first correction circuit $66_1$ both of which will be operable in a manner to be described later. The first partial provisional quotient $P_1$ is processed together with the first provisional quotient $R_1$ (FIG. 4) in a manner similar to that mentioned in conjunction with FIG. 1.

Figure 5:
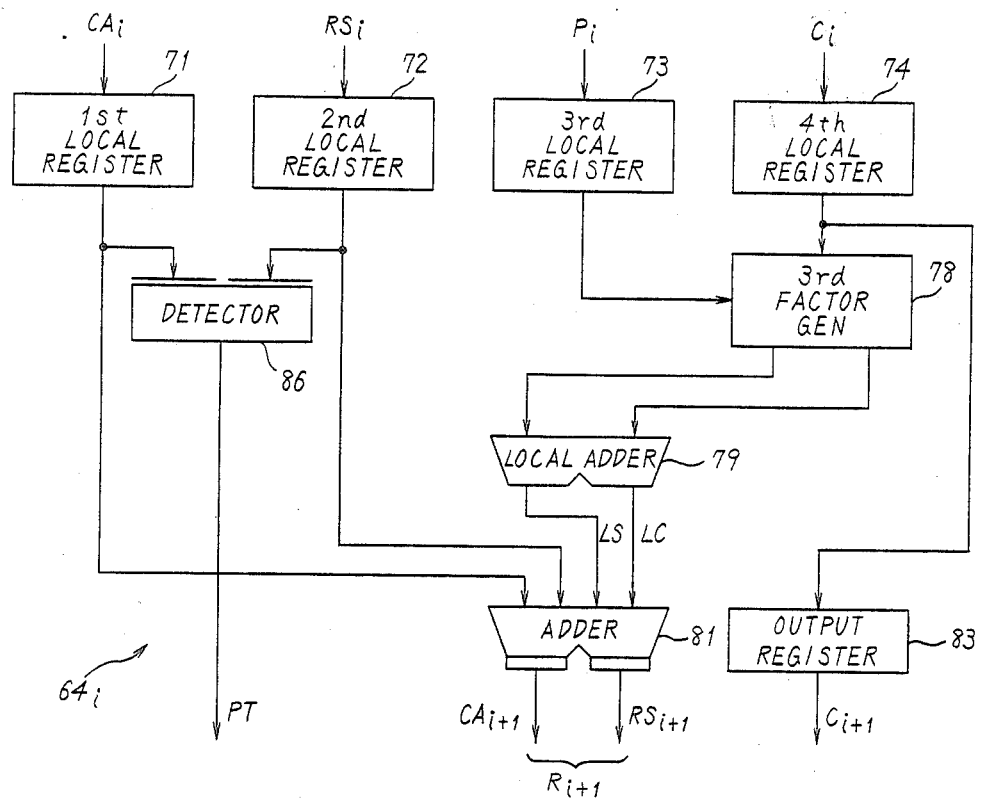
FIG. 5 is a block diagram of each partial divider for use in the electronic circuit illustrated in FIG. 2.

Referring to FIG. 5 anew and FIG. 2 again, the first partial divider $64_1$ may be specified by a suffix $i=1$ in FIG. 5 and is coupled to the first and the second multiplication circuits 36 and 37 and to the first adder circuit 61 which are all illustrated in FIG. 2. As shown in FIG. 5, the first partial divider 64, comprises first, second, third, and fourth local registers 71, 72, 73, and 74 supplied with the first carry $CA_1$, the first sum $RS_1$, the first partial provisional quotient $P_1$, and the correction factor $C_1$, respectively.

In the first partial divider $64_1$, the first partial provisional quotient $P_1$ of (000010.1) is processed in a third factor generator 78 in the manner described in conjunction with Table 1. More specifically, the multiplying factors of 0, 1, and $-1$ are selected for the respective groups of the first partial provisional quotient $P_1$ in accordance with Table 1 and assigned with the weights of $2^4$, $2^2$, and $2^0$ to form first, second, and third partial multiplicands represented by $0 \cdot 2^4$, $1 \cdot 2^2$, and $-1 \cdot 2^0$, respectively.

Under the circumstances, the third factor generator 78 multiplies the first through the third partial multiplicands by the correction factor $C_1$ of $(-0.FF9)_{16}$ to calculate first, second, and third partial local products, respectively. A local carry saving adder 79 sums up the first through the third partial local products to supply an output carry saving adder 81 with a local sum LS and a local carry LC. A combination of the local sum LS and the local carry LC is representative of a product of the correction factor $C_1$ and the first partial provisional quotient $P_1$. In the above-mentioned example, the local sum LS and the local carry LC are equal to (111100.111111100101) and (000000.000000110000), respectively.

The output carry saving adder 81 is also supplied with the first sum $RS_1$ and the first carry $CA_1$ as the first provisional quotient $R_1$. As a result, the output carry saving adder 81 carries out addition of the local sum LS, the local carry LC, the first sum $RS_1$, and the first carry $CA_1$ to produce a second sum $RS_2$ and a second carry $CA_2$ as the second provisional quotient $R_2$. Practically, results of addition are shifted by four bits upwards by multiplication of $g=16$ to obtain the second sum $RS_2$ and the second carry $CA_2$. In the example, the second sum $RC_2$ and the second carry $CA_2$ are therefore equal to $(111100.11010101)_2$ and $(000010.01000000)_2$, respectively.

In the first partial divider $64_1$, the correction factor $C_1$ stored in the fourth local register 74 is shifted to an output register 83 and is produced simultaneously with the second provisional quotient $R_2$. Thus, the output register 83 serves to adjust timing of the correction factor $C_1$ and to produce a timing adjusted factor $C_2$.

Although a sign detector 86 is illustrated in FIG. 5, the sign detector 86 is useless in the first partial divider $64_1$ and will therefore be described later.

As shown in FIG. 2, the second sum $RS_2$ and the second carry $CA_2$ are partially sent to a first quotient adder $91_1$. Practically, the first quotient adder $91_1$ adds nine upper bits of the second carry $CA_2$ to nine upper bits of the second sum $RS_2$ to calculate the second partial provisional quotient $P_2$. In the example in question, the second partial provisional quotient $P_2$ becomes equal to $(111111.0)_2$ when taken to the first place of the binary point.

The second partial provisional quotient $P_2$ is supplied to a second partial divider $64_2$ together with the second sum $RS_2$, the second carry $CS_2$, and the timing adjusted factor $C_2$ which are all given from the first partial divider $64_1$.

In FIG. 5, the second partial divider $64_2$ may be specified by $i=2$ and is similar in structure and operation to the first partial divider $64_1$ except that the second partial divider $64_2$ comprises the sign detector 86. More particularly, the second carry $CA_2$, the second sum $RS_2$, the second partial provisional quotient $P_2$, and the timing adjusted factor $C_2$ are kept in the first through the fourth local registers 71 to 74, respectively. In the second partial divider $64_2$, the sign detector 86 sums up the second sum $RS_2$ and the second carry $CA_2$ to detect whether a most significant bit of the sum is equal to "1" or "0" and to produce a sign bit PT. If the most significant bit of the sum takes the logic "1" and specifies a negative number, the sign bit PT becomes the logic "1." Otherwise, the sign bit PT becomes the logic "0" to specify a positive number. Thus, the sign bit PT indicates a sign of the second provisional quotient $R_2$. In the above-mentioned example, the sign bit PT takes the logic "1" because the logic "1" is placed at the most significant bit when the second sum $RS_2$ is added to the second carry $CA_2$, as readily understood from the above.

In addition, the second partial divider $64_2$ produces a third provisional quotient $R_3$ equal to a combination of a third sum $RS_3$ and a third carry $CA_3$ along with another timing adjusted factor $C_3$, like the first partial divider $64_1$.

Figure 6:
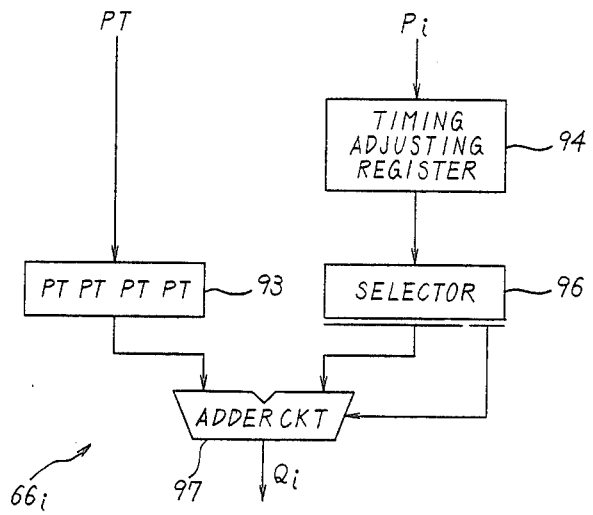
FIG. 6 is a block diagram of each correction circuit for use in the electronic circuit illustrated in FIG. 2.

Referring to FIG. 6 together with FIG. 2, the sign bit PT is delivered from the second partial divider $64_2$ to the first correction circuit $66_1$ along with the first partial provisional quotient $P_1$. In FIG. 6, the first correction circuit $66_1$ may be for $i=1$. The first correction circuit $66_1$ adds $(-1)$ to the first partial provisional quotient $P_1$ when the sign bit PT takes the logic "1." Otherwise, the first correction circuit $66_1$ adds "0000" to the first partial provisional quotient $P_1$, namely, allows the first partial provisional quotient $P_1$ to pass therethrough.

As known in the art, four bits from $2^3$ to $2^0$ are representative of principal values (mod 16). The number $(-1)$ may be made to correspond to the principal value of 15.

Under the circumstances, the sign bit PT is rendered by a wiring (indicated at 93) into four parallel bits each of which takes the same logic "1" or "0" as the sign bit PT. Therefore, the sign bit PT is produced through the wiring 93 as a first value x representative of either (1111) or (0000).

On the other hand, the first partial provisional quotient $P_1$ of $(000010.1)_2$ is sent through a timing adjusting register 94 to a selector 96. The selector 96 selects five lower bits of (00101) from the first partial provisional quotient $P_1$ and divides the five lower bits into four upper bits (0010) and the least significant bit (1) which may be called second and third values y and c, respectively.

An adder circuit 97 calculates a sum of the first through the third values x, y, and c. From this fact, it is readily understood that the adder circuit 97 selectively carries out a round-up and a round-off operation when the least significant bit takes the logic "1" and "0," respectively. Thus, the sum of the first through the third values x, y, and c is produced as the first partial quotient $Q_1$ modified or corrected in consideration of the sign bit PT representative of the sign of the second partial provisional quotient $R_2$. As to the example, the first partial quotient $Q_1$ becomes equal to (0010) because a result of addition between the second and the third values y and c becomes equal to (0011) and is added to the first value x of (1111).

In FIG. 2, the third sum $RS_3$ and the third carry $CA_3$ are partially sent to a second quotient adder $91_2$. The second quotient adder $91_2$ calculates a third partial provisional quotient $P_3$ in the manner described in connection to the first quotient adder $91_1$. In the example, the third partial provisional quotient $P_3$ is represented by (000001.0).

The third sum $RS_3$ and the third carry $CA_3$ are also sent from the second partial divider $64_2$ as the third provisional quotient $R_3$ to a third partial divider $64_3$ together with another time adjusted factor $C_3$. The third partial divider $64_3$ calculates a fourth provisional quotient $R_4$ represented by a fourth sum $RS_4$ and a fourth carry $CA_4$ in the manner described in conjunction with the second partial divider $64_2$. In addition, the third partial divider $64_3$ detects the sign of the third partial quotient $R_3$ to supply a second correction circuit $66_2$ with the sign bit PT. A timing adjusted factor $C_4$ is transferred in the manner mentioned with reference to FIG. 5.

In any event, the second correction circuit $66_2$ corrects the second partial provisional quotient $P_2$ in accordance with the sign bit PT indicative of the sign of the third provisional quotient $R_3(=CA_3+RS_3)$, like the first correction circuit $66_1$. Thus, the second partial quotient $Q_2$ is produced from the second correction circuit $66_2$. In the above-mentioned example, the second partial quotient $Q_2$ becomes $(1111)_2$ because the five lower bits of the second partial provisional quotient $P_2$ is equal to (1111.0) and the sign of the third provisional quotient $R_3$ takes the logic "0."

Similar operation is successively carried out to calculate each of the first through the (N−1)-th partial quotients $Q_1$ to $Q_{N-1}$. Let the (N−1)-th partial quotient $Q_{N-1}$ be calculated with reference to the (N−1)-th partial provisional quotient $P_{N-1}$ and the sign bit PT given from the N-th partial divider $64_N$.

It is mentioned here that an (N+1)-th partial quotient $Q_{N+1}$ is unnecessary for the illustrated electronic circuit and, therefore, may not be calculated. This means that an (N+1)-th partial divider is unnecessary and only a sign bit PT may be derived from the (N+1)-th sum $RS_{N+1}$ and the (N+1)-th carry $CA_{N+1}$. For this purpose, an additional sign detector 101 is connected to the N-th partial divider $64_N$ to detect the sign of the (N+1)-th provisional quotient $R_{N+1}$ equal to a sum of the (N+1)-th sum $RS_{N+1}$ and the (N+1)-th carry $CA_{N+1}$. The sign bit PT is supplied from the additional sign detector 101 to the N-th correction circuit $66_N$ to correct the N-th partial provisional quotient $P_N$. As a result, the N-th partial quotient $Q_N$ is produced from the N-th correction circuit $66_N$.

Anyway, the first through the N-th correction circuits $66_1$ to $66_N$ correct the first through the N-th partial provisional quotients $P_1$ to $P_N$ with reference to the second through the (N+1)-th provisional quotients $R_2$ to $R_{N+1}$, respectively.

In FIG. 2, it is readily understood that circuit elements between the first adder circuit 61 and the N-th correction circuit $66_N$, both inclusive, are operable in response to the correction factor $C_1$ and the first provisional quotient $R_1$ supplied from the first and the second multiplication circuits 36 and 37, respectively, and serve to process the first provisional quotient $R_1$ with reference to the correction factor $C_1$ to successively produce a succession of the first through the N-th partial quotients. Therefore, a combination of the above-mentioned elements may be called a processing circuit for processing the first provisional quotient $R_1$. In addition, the first through the N-th partial dividers $64_1$ to $64_N$ are connected in cascade to one another, as shown in FIG. 2.

The first through the N-th partial quotients $Q_1$ to $Q_N$ are time sequentially supplied from the respective correction circuits $66_1$ to $66_N$ to a synchronization circuit 105. The synchronization circuit 105 serves to arrange the first through the N-th partial quotients $Q_1$ to $Q_N$ and to synchronously produce them in parallel. In other words, the synchronization circuit 105 is operable to collect the first through the N-th partial quotients $Q_1$ to $Q_N$ into the eventual quotient Q and may comprise first through N-th shift registers which provide different delays, respectively. Finally, the eventual quotient Q is kept in a result register 106.

After the first partial quotient $Q_1$ is calculated in cooperation with the first adder 61, the second partial divider $64_2$, and the first correction circuit $66_1$, the second partial quotient $Q_2$ is calculated in cooperation with the first quotient adder $91_1$, the third partial divider $64_3$, and the second correction circuit $66_2$. Similarly, operation for a single division is successively progressive from an upper part of the electronic circuit illustrated in FIG. 2 to a lower part thereof. Thus, only a part of the electronic circuit is used for the single division with the remaining part kept inactive. This means that a plurality of divisions can successively be carried out in the electronic circuit as is the case with the pipeline method. Accordingly, it is possible for the illustrated electronic circuit to improve a throughput for processing divisions.

While this invention has thus far been described in conjunction with a preferred embodiment thereof, it will readily be possible for those skilled in the art to put this invention into practice in various other manners. For example, the g-ary number may be a binary number or the like. Multiplication may be carried out in accordance with any other algorithms than Booth algorithm.

What is claimed is:

1. An electronic circuit for dividing a dividend (RR) by a divisor (RD) to calculate an eventual quotient (Q) which has a plurality of digits, N in number, and is divisible into first through N-th partial quotients ($Q_1$ through $Q_N$) for the respective digits, said electronic circuit comprising:

reciprocal calculating means (34) responsive to said divisor for calculating an approximate reciprocal (RC) of said divisor;

first calculating means (36) responsive to said divisor and said approximate reciprocal for calculating a correction factor (C1) which is equal to a product of said divisor and said approximate reciprocal;

second calculating means (37) responsive to said dividend and said approximate reciprocal for calculating a first provisional quotient ($R1 = CA1 + RS1$) which is equal to a product of said dividend and said approximate reciprocal;

a plurality of provisional quotient calculating means ($64_1$ through $64_N$), N in number a first one of which is responsive to said first provisional quotient and said correction factor and which are coupled to one another in cascade, for successively calculating second through (N+1)-th provisional quotients (R2 through RN+1), respectively;

partial quotient calculating means ($61_1$, $91_1$ to $91_{N-1}$, $66_1$ to $66_N$, 101) coupled to said second calculating means and said plurality of the provisional calculating means for producing first through N-th partial quotients (Q1 to QN); and collecting means (105) for collecting said succession of the first through N-th partial quotients into said eventual quotient.

2. An electronic circuit as claimed in claim 1, wherein said partial quotient calculating means comprises:

supplying means (61) responsive to a part of said first provisional quotient for supplying, to said first one of the provisional quotient calculating means, a first partial provisional quotient (P1) related to said first partial quotient;

a plurality of deciding means ($91_1$ to $91_{N-1}$), N−1 in number, coupled to said plurality of the provisional quotient calculating means for successively deciding second through N-th partial provisional quotients (P2 to PN) in response to said second through said N-th provisional quotients, respectively; and correcting means ($66_1$ to $66_N$, 101) coupled to said supplying means, said plurality of the deciding means, and said plurality of the provisional quotient calculating means for successively correcting said first through said N-th partial provisional quotients into said first through said N-th partial quotients in consideration of said second through said (N+1)-th provisional quotients.

3. An electronic circuit as claimed in claim 1, wherein said collecting means comprises:

means for synchronously producing said succession of first through N-th partial quotients as said eventual quotient.

* * * * *